United States Patent
SenGupta et al.

(10) Patent No.: US 7,901,577 B2
(45) Date of Patent: Mar. 8, 2011

(54) BRACKISH AND SEA WATER DESALINATION USING A HYBRID ION EXCHANGE-NANOFILTRATION PROCESS

(75) Inventors: Arup K. SenGupta, Bethlehem, PA (US); Sudipta Sarkar, Bethlehem, PA (US)

(73) Assignee: Arup K. SenGupta, Bethlehem, PA (US)

( * ) Notice: Subject to any disclaimer, the term of this patent is extended or adjusted under 35 U.S.C. 154(b) by 387 days.

(21) Appl. No.: 12/030,532

(22) Filed: Feb. 13, 2008

(65) Prior Publication Data

US 2008/0277344 A1    Nov. 13, 2008

Related U.S. Application Data

(60) Provisional application No. 60/917,429, filed on May 11, 2007.

(51) Int. Cl.
*B01D 61/02* (2006.01)
*B01D 61/00* (2006.01)
*C02F 1/42* (2006.01)
*C02F 1/44* (2006.01)
*C02F 1/469* (2006.01)

(52) U.S. Cl. .............. 210/638; 210/652; 210/748.01; 204/522; 204/525; 204/523; 204/529

(58) Field of Classification Search ............ 210/638
See application file for complete search history.

(56) References Cited

U.S. PATENT DOCUMENTS

| | | | | |
|---|---|---|---|---|
| 3,639,231 A | * | 2/1972 | Bresler | 210/638 |
| 3,933,610 A | * | 1/1976 | Ehara et al. | 204/529 |
| 5,246,586 A | * | 9/1993 | Ban et al. | 210/638 |
| 5,766,479 A | * | 6/1998 | Collentro et al. | 210/639 |
| 2005/0051491 A1 | | 3/2005 | Jacob, IV | |
| 2007/0080113 A1 | | 4/2007 | Yuong | |

FOREIGN PATENT DOCUMENTS

JP    8089958 A  *  4/1996

OTHER PUBLICATIONS

Andrews, W.T., W.F. Pergande and G. McTaggart (2001, "Energy Performance Enhancement of 950 m3/d Seawater Reverse Osmosis Unit in Grand Cayman", Desalination 135: 195-204.

(Continued)

*Primary Examiner* — Walter D Griffin
*Assistant Examiner* — Denise R Anderson
(74) *Attorney, Agent, or Firm* — Howson & Howson LLP

(57) ABSTRACT

Desalination is carried out by a hybrid ion exchange-nanofiltration process in which ion exchange is followed by pressure-driven nanofiltration. Monovalent ions of sodium and chloride of saline water are exchanged for equivalent concentrations of poly-valent ions (for example, sodium ions for magnesium ions or chloride ions for sulfate ions) when passed through ion exchangers in the form of those poly-valent ions. The resultant solution has a lower osmotic pressure than the initial solution containing monovalent sodium and chloride ions, and requires less transmembrane pressure for membrane desalination compared to traditional reverse osmosis. The concentrated reject stream from the membrane process is used as regenerant for the exhausted ion exchanger, which has been converted to monovalent anionic or cationic form.

12 Claims, 9 Drawing Sheets

OTHER PUBLICATIONS

USBR and SNL (United States Bureau of Reclamation and Sandia National Lanboratories). (2003) "Desalination and Water Purification Technology Roadmap: A Report of the Executive Committee. Desalination & Water Purification Research & Development Report #95", Denver, CO: United States Department of the Interior, Bureau of Reclamation, Water Treatment and Engineering Group.

Schaep J., Van der Bruggen, B., Vandecasteele, C., Wilms, D. (1998), "Influence of Ion Size and Charge in Nanofiltration", Separation and Purification Technology, 14, 155-162.

Mukherjee, P. and SenGupta, A.K. (2006), "Some observations about electrolytic permeation mechanism through reverse osmosis and nanofiltration membranes", Journal of Membrane Science, 278, 301-307.

Water Science and Technology Board, Divisiion on Earth and Life Studies, National Research Council of National Academies (2004), "Review of the Desalination and Water Purification Technology Roadmap", National Academies Press, Washington, D.C.

* cited by examiner

BRACKISH AND SEA WATER DESALINATION USING A HYBRID ION EXCHANGE-NANOFILTRATION PROCESS

CROSS-REFERENCE TO RELATED APPLICATION

This application claims priority on the basis of provisional patent application 60/917,429, filed on May 11, 2007. The disclosure of the provisional application is incorporated by reference.

FIELD OF THE INVENTION

The invention pertains to the desalination of saline solutions that contain high concentrations of sodium chloride, especially seawater and brackish water.

BACKGROUND OF THE INVENTION

Desalination of saline water resources has been receiving much attention because of the increasing demand for fresh water in water-starved regions around the world. Available desalination technologies can be broadly categorized in three different groups.

A first approach is to use thermal means to change the phase of the water (from liquid to vapor, or from liquid to solid), and then separate the pure phase from the remaining salt solution. The separation step can be followed by recovery of thermal energy for reuse, as the vapor or solid phase changes to the liquid phase.

In a second approach, salt and water are physically separated by means of a semi-permeable membrane, under the influence of a chemical potential gradient which may be effected by application of pressure, by a concentration gradient or by an electrical potential.

A third method is chemical means to produce desalinated water which include ion exchange, liquid-liquid extraction, separation by formation of gas hydrates, or other precipitation mechanisms.

It is believed that all currently known desalination methods use one or more of the above three basic approaches. A number of these processes for desalination have been commercialized. These include thermal distillation, reverse osmosis, and electrodialysis. However, all of these desalination processes suffer from a major handicap, namely, costly energy consumption.

Thermal desalination processes require energy ranging from 20 kJ/kg to more than 200 kJ/kg. Energy requirements for reverse osmosis depend on concentration, and range from about 10 kJ/kg for brackish water to about 20 kJ/kg for seawater. According to Andrews, W. T., W. F. Pergande and G. McTaggarat (2001), "Energy Performance Enhancement of 950 m$^3$/d Seawater Reverse Osmosis Unit in Grand Cayman", Desalination 135: 195-204, even with the latest state-of-the-art technology, the energy requirement for reverse osmosis is still about 8.4 kWh/1000 gallon (2.2 kWh/m$^3$).

While other costs are important, energy cost is the decisive factor preventing wide use of desalination processes. According to a recent estimate, for a reverse osmosis desalination plant, the cost of electric power constitutes 44% of the total cost of producing desalinated water, while the fixed charges or capital costs are 37% of the total cost. This estimate was reported in USBR and SNL (United States Bureau of Reclamation and Sandia National Laboratories). (2003) "Desalination and Water Purification Technology Roadmap: A Report of the Executive Committee. Desalination & Water Purification Research & Development Report #95", Denver, Colo.: United States Department of the Interior, Bureau of Reclamation, Water Treatment and Engineering Group.

The USBR and SNL report also indicated that the minimum energy that is thermodynamically required for desalination of seawater containing 3.5% solution of sodium chloride due to osmotic pressure is 0.82 kWh/m$^3$.

There have been efforts to produce new types of improved membranes and equipment so that energy requirements are reduced, but these efforts alone cannot dramatically reduce the energy consumption figure. There is therefore a need for a new technology which addresses the energy problem in such a way as to effect a paradigm shift in energy consumption.

SUMMARY OF THE INVENTION

A general object of this invention is to achieve a significant reduction in the energy needed to desalinate saline water such as seawater and brackish water.

Briefly, in the process according to the invention heterovalent ion exchange is used to convert a saline solution to a solution having a reduced osmotic pressure. The latter solution is then passed through a semi-permeable membrane separator under a pressure lower than that required for reverse osmosis of the original saline solution.

More specifically, in the desalination process of the invention, water containing sodium chloride is exposed to an ion exchange material in divalent or polyvalent ionic form. In the ion exchange material, the monovalent sodium ions, or the monovalent chloride ions, or both the monovalent sodium ions and the monovalent chloride ions of at least a portion of the sodium chloride content in the water, are exchanged for divalent or polyvalent ions. The result is the production of a solution containing the divalent or polyvalent ions in lieu of the monovalent ions with which the divalent or polyvalent ions are exchanged. This solution has an osmotic pressure lower than the osmotic pressure of the original water containing sodium chloride. The solution is then passed through a semi-permeable membrane separator to separate the divalent or polyvalent ions from the solution, thereby producing desalinated water.

Preferably, the solution is caused to pass through a semi-permeable membrane separator capable of separating the constituent divalent or polyvalent ions. The membrane of choice depends on the nature of the ions being separated. In particular, for a solution containing divalent ions, a nanofiltration membrane is preferable because, for a given degree of separation (exclusion), it offers less resistance than a reverse osmosis membrane. The pressure required for desalination by this process is lower than that required for direct removal of sodium chloride using a reverse osmosis membrane for two reasons. First, the solution containing exchanged divalent or polyvalent ions has a lower osmotic pressure than the original sodium chloride solution. Second, nanofiltration membrane offers less resistance to flow than a reverse osmosis membrane.

In a preferred embodiment, the divalent or polyvalent ions separated from the solution are collected, and the ion exchange material is exposed to, and regenerated by, the collected divalent or polyvalent ions. The step of exposing water containing sodium chloride to an ion exchange material can be carried out by passing water containing sodium chloride, in a repeating sequence, through plural beds of ion exchange material, and each of the plural beds of ion exchange material can be exposed to collected divalent or polyvalent ions, and thereby regenerated, while water containing sodium chloride is passing through at least one other bed of the plural beds. The term "bed," as used herein with reference to an ion exchange medium should be understood as encompassing ion exchange columns and other forms of apparatus in which a solution can be exposed to an ion exchange medium.

DETAILED DESCRIPTION OF THE PREFERRED EMBODIMENT

Figure 1:
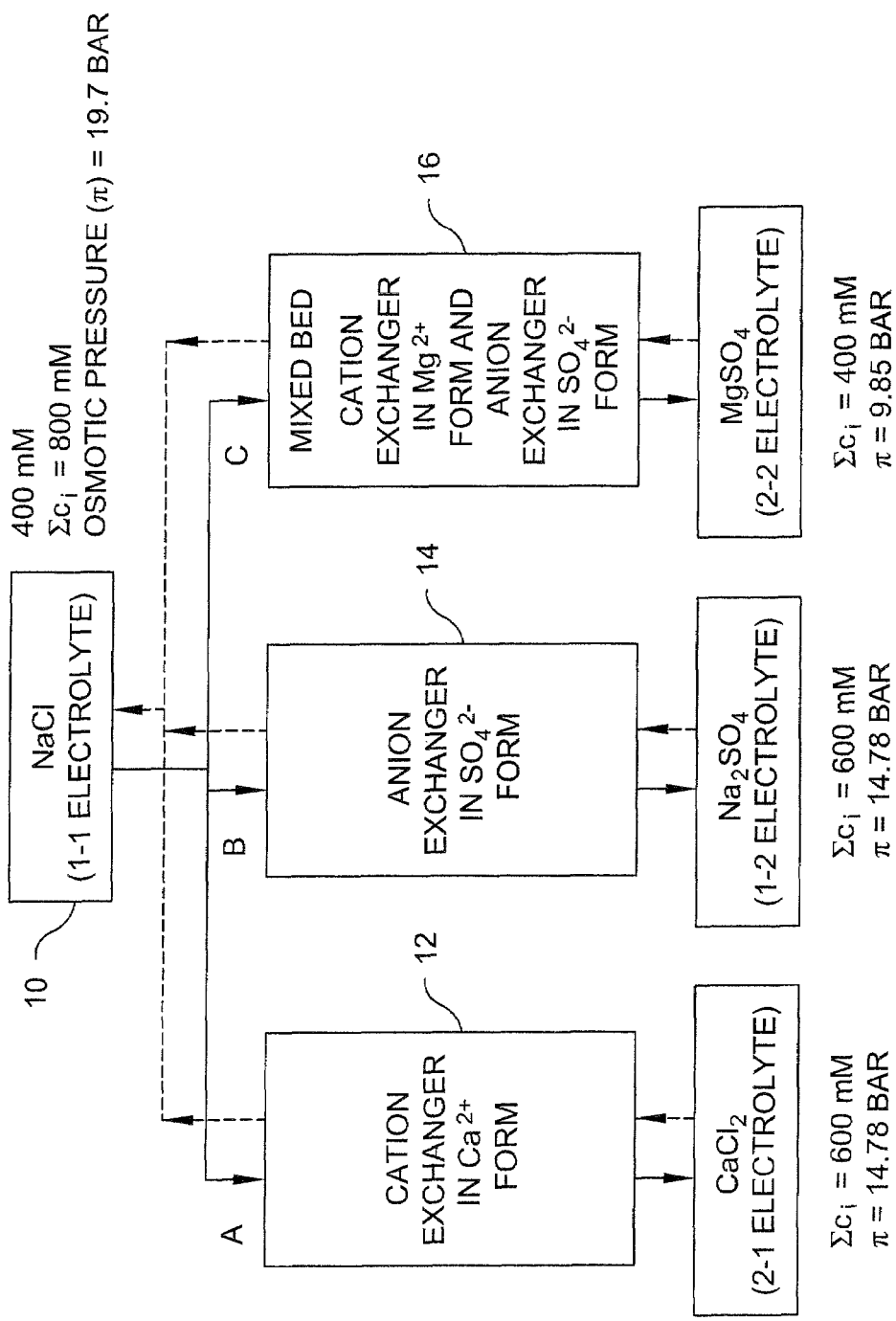
FIG. 1 is a schematic diagram showing three examples of ion exchange steps carried out on saline solution and producing solutions each having an osmotic pressure lower than that of the original saline solution.

Sodium chloride is the primary constituent of high dissolved solids in seawater and brackish water. Desalination essentially means removal of sodium chloride, which, in the aqueous phase, exists as a monovalent sodium cation ($Na^+$) and a monovalent chloride anion ($Cl^-$).

Because it consists of a monovalent cation and a monovalent anion, sodium chloride is referred to as a "1-1 electrolyte," reverse osmosis (RO) processes are pressure-driven, semi-permeable membrane processes that are currently universally used to produce salt-free permeate through rejection of sodium chloride. Although conventional nanofiltration (NF) processes require significantly lower transmembrane pressures compared to RO processes, they are unsuitable for rejection of sodium chloride.

The distinction between reverse osmosis membrane and a nanofiltration membrane is as follows. Reverse osmosis membranes have a dense polymer layer with pores having diameters in the range from approximately 2-5 Å, and are capable of greater than 99% rejection of monovalent ions such as $Na^+$, $Cl^-$, etc. from an aqueous solution. In contrast, nanofiltration membranes have pores with diameters in the range from about 5-15 Å. Nanofiltration membranes are capable of achieving greater than 90% removal of divalent and polyvalent ionic species such as $SO_4^{2-}$, $Ca^{2+}$, $Mg^{2+}$, etc. from and aqueous solution, but can achieve only up to about 70% rejection of monovalent species from the aqueous solution. The molecular weight cut off (MWCO) for reverse osmosis membranes is less than 150 Dalton, whereas the MWCO for nanofiltration membranes is in the range from 150-300 Dalton.

The invention makes use of three principles in a new process for desalination.

First, an ion exchange process works on an equivalent basis. An ion exchanger in the form of an ion with valence "n" exchanges this ion with a number "n" of monovalent ions. The main ion components of the salt in saline water are sodium (a cation) and chloride (an anion). When the saline feed water is subjected to an ion exchanger in the form of a divalent (n=2) or polyvalent anion (such as sulfate) or a cation (such as calcium) or both, a number "n" of monovalent chloride or sodium ions, or both, are taken up by the ion exchanger for release of each of the corresponding divalent anion or cation or both. Thus, in the case of a divalent ion exchanger, two sodium ions, or two chloride ions, are taken up for each divalent exchanger ion. The process may be termed an "heterovalent" ion exchange process.

Second, the osmotic pressure of a solution, which determines the transmembrane pressure required to desalinate a solution using a semi-permeable membrane, depends on the summation of the molar concentrations of ions in solution. As a result of the heterovalent ion exchange process, the sum of molar concentrations of the ions in the solution is decreased. (For the exchange of a number "n" of monovalent ions, only one exchanger ion of valence "n" is released.) As a result, the osmotic pressure of the resultant solution becomes lower than that of the original saline solution.

The alteration of osmotic pressure by means of ion exchange is illustrated in FIG. 1. A solution 10 of sodium chloride (NaCl), which is a 1-1 electrolyte, is shown passing through three exchangers 12, 14 and 16. Exchanger 12 is a cation exchanger in $Ca^{2+}$ form. Exchanger 14 is an anion exchanger in $SO_4^{2-}$ form, and exchanger 16 is a mixed bed exchanger having a cation exchanger medium in $Mg^{2+}$ form and an anion exchanger medium in $SO_4^{2-}$ form.

As shown in FIG. 1, the influent NaCl solution has a concentration of 400 millimoles (mM). In the influent NaCl solution, the sum of the molar concentrations of the ions, $\Sigma Ci$, is 800 mM, and the osmotic pressure ($\pi$) is 19.7 bar. The effluent from cation exchanger 12 is a solution of calcium chloride ($CaCl_2$) a 2-1 electrolyte, in which the sum $\Sigma Ci$ of the molar concentrations of its ions is 600 mM. This effluent has an osmotic pressure $\pi$ of 14.78 bar. The sodium sulfate ($Na_2SO_4$) effluent from anion exchanger 14, which is a 1-2 electrolyte, similarly has an $\Sigma Ci$ of 600 mM and an osmotic pressure $\pi$ of 14.78 bar.

In the case of the mixed bed exchanger, in the magnesium sulfate ($MgSO_4$) effluent solution, the sum $\Sigma Ci$ of the molar concentrations of the ions is only 400 mM, and the osmotic pressure $\Sigma Ci$ is 9.85 bar.

Third, nanofiltration membranes are designed to reject ions with a valence greater than one selectively. They are, however, permeable to monovalent ions. Nanofiltration membranes offer less resistance to passage of water compared to reverse osmosis membranes, and hence require less transmembrane pressure as a driving pressure. The resultant solution after the ion exchange process contains at least one category of ion that has a valence greater than one. These ions having a valence greater than one are well rejected by the nanofiltration membrane. Transport across the membrane is a coupled process. When one category of ion is rejected by the membrane, the complementary ions, even if monovalent, are also rejected by the membrane to maintain electro-neutrality of the solution. Thus, when the resultant solution after the heterovalent ion exchange process is subjected to nanofiltration, is effectively desalinated using the nanofiltration membrane. A conventional reverse osmosis process is not required.

Nanofiltration membranes can be operated at a lower pressure, compared to reverse osmosis membranes. Thus, the process allows desalination at a lower energy consumption.

After desalination, the reject stream from the nanofiltration process, which contains a high concentration of divalent or polyvalent ions, is utilized to regenerate the ion exchanger, releasing sodium chloride. The overall process can be sustained without requiring any separate chemical regenerant.

Nanofiltration (NF) membranes are characterized by two properties that distinguish them from RO membranes.

First, they are permeable to monovalent ions, or 1-1 electrolytes such as sodium chloride, but they reject divalent cations or anions (e.g., $Ca^{2+}$, $Mg^{2+}$, $SO_4^{2-}$) very well. This behavior of NF membranes is described in Schaep, J., Van der Bruggen, B., Vandecasteele, C., Wilms, D. (1998), "Influence of Ion Size and Charge in Nanofiltration", *Separation and Purification Technology*, 14, 155-162. Thus, 1-2 electrolytes, e.g., $Na_2SO_4$; 2-1 electrolytes, e.g., $CaCl_2$, and 2-2 electrolytes, e.g., $MgSO_4$, are well rejected by NF membranes.

Second, for identical feed concentrations containing divalent cations and anions, NF membranes offer much higher water flux than RO membranes at identical transmembrane pressures. Thus, for the same dissolved solids concentration containing divalent ions, NF is more energy efficient than RO.

The two above-mentioned properties of NF membranes can be fully utilized to desalinate water containing only sodium chloride (a 1-1 electrolyte) by putting an appropriate ion-exchange stage ahead of the nanofiltration stage.

Ion exchange works on an equivalent basis, while the osmotic pressure of a solution is dependent solely on molar concentration. Thus, ion exchange can effectively reduce the osmotic pressure of sodium chloride as illustrated in FIG. 1.

Ion exchange is a reversible process. Thus, as shown by the broken lines in FIG. 1, by reversing the direction of flow through the exchangers, sodium chloride can be reproduced from $CaCl_2$, $Na_2SO_4$ or $MgSO_4$.

Ion exchange prior to nanofiltration offers at least three specific advantages for desalination of water containing sodium chloride. First, as shown in FIG. 1, the osmotic pressure of the sodium chloride solution is significantly reduced. Second, the resulting 1-2 ($Na_2SO_4$), 2-1 ($CaCl_2$) and 2-2 ($MgSO_4$) electrolytes are well rejected by nanofiltration. That is, the salt permeability is very low. Third, Compared to reverse osmose, a higher water flux will be obtained with nanofiltration at identical transmembrane pressures for 1-2, 2-1 and 2-2 electrolytes. Thus, the overall energy consumption is greatly reduced.

Permeation of electrolytes through RO or NF membranes occurs as a coupled transport process i.e., the transport of a cation is always accompanied by an equivalent amount of anions. The coupled transport process is discussed in Mukherjee, P. and SenGupta, A. K. (2006), "Some observations about electrolytic permeation mechanism through reverse osmosis and nanofiltration membranes", *Journal of Membrane Science*, 278, 301-307. The salt permeability depends on the interdiffusion coefficient of permeating cations and anions. Thus, for $Na_2SO_4$ (a 1-2 electrolyte), the transport of $Na^+$ across the membrane is controlled by the permeability of divalent $SO_4^{2-}$. Consequently, the permeability of $Na^+$ present as $Na_2SO_4$ is significantly less than that of $Na^+$ as NaCl. Because the divalent ion predominates the overall rejection process, when a 1-1 electrolyte is transformed into 1-2 or 2-1 electrolyte by ion exchange, nanofiltration becomes viable as a semi-permeable membrane process.

Figure 2:
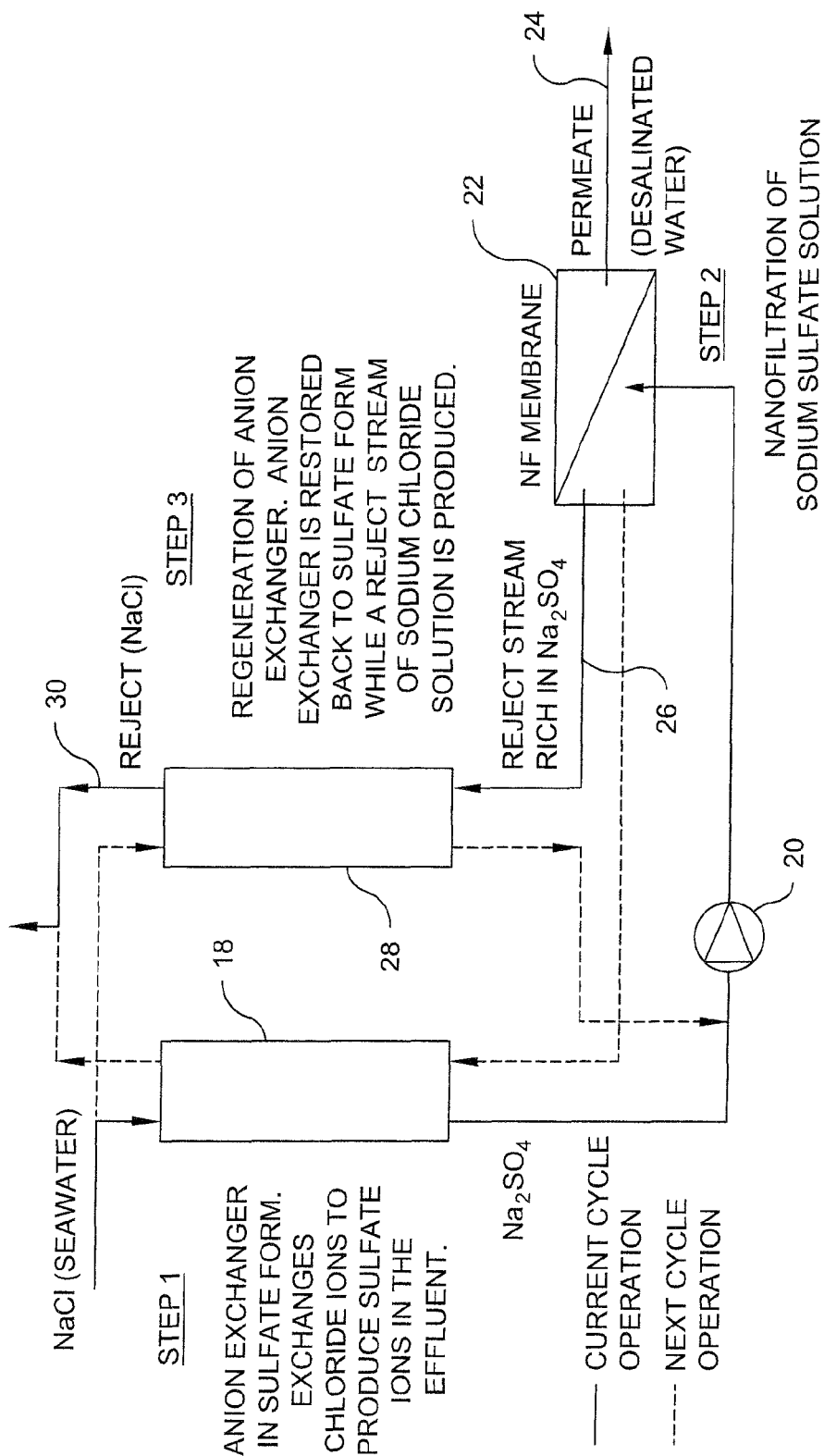
FIG. 2 is a schematic diagram illustrating a process in accordance with the invention, carried out using two anion exchangers which are alternately regenerated so that desalinated water can be supplied continuously.

The process steps are illustrated in FIG. 2, where, as a first step, incoming sea water or other water containing NaCl is passed through an anion exchanger 18 in sulfate form, with a concomitant reduction in molar concentration. The resulting $Na_2SO_4$ (a 1-2 electrolyte) has a 30% lower osmotic pressure, but the equivalent electrolyte concentration remains the same.

As a second step, the sodium sulfate solution is fed under pressure by a pump 20 to a sulfate-rejecting nanofiltration (NF) membrane 22. Since the sulfate passage through this NF membrane is extremely low and the osmotic pressure is already reduced due to the conversion of 1-1 NaCl to 1-2 $Na_2SO_4$, a very high water flux is obtained at a low transmembrane pressure. As mentioned previously, since sodium ions are coupled with sulfate in the feed, sodium passage through the NF membrane is controlled by sulfate and is therefore also low. Desalinated water is discharged from the NF membrane 22 through path 24.

As a third step, the reject stream from the NF membrane, which is rich in sulfate content, flows through path 26 and through an exhausted ion-exchange column 28, which is now in chloride form. Column 28 is transformed back into the sulfate form, and the resulting effluent in path 30 contains NaCl (a 1-1 electrolyte).

When column 18 is exhausted, and column 28 is regenerated, flow in the system is switched by suitable valving (not shown) so that the flow follows the paths indicated by broken lines. The inflowing seawater is directed to column 28, and the reject stream from the NF membrane 22 regenerates exchanger 18.

The two anion exchange columns operate in alternating fashion, and can deliver a substantially continuous stream of desalinated water through path 24. No external regenerant is required, and the process is self-sustaining.

FIG. 2 illustrates a particular case in which the chloride ion in the saline water is exchanged for sulfate ions with which the anion exchangers are pre-saturated. However, the process can operate in a similar manner when the influent water has monovalent ions other than chloride, and the ion exchange resin is pre-saturated with divalent or higher valent ions other than sulfate ions. Similarly, the process can operate when the sodium ion or other monovalent ions in the influent water are exchanged for divalent or higher valent cations such as calcium, etc.

The process can also be carried out by exchange of both of the constituting ions of a 1-1 electrolyte, for example, both sodium and chloride ions, to produce a 2-2 electrolyte such as $MgSO_4$, or a still higher valence electrolyte. In such a case the osmotic pressure of the solution exiting the exchanger will be still lower than in the case of a 1-2 or 2-1 electrolyte.

The following examples illustrate several preferred embodiments of the invention.

Example 1

Different concentrations of solutions containing sodium chloride and sodium sulfate were subjected to pressure-driven nanofiltration and reverse osmosis, where the permeate flux, salt concentrations in the feed and permeate and differential feed pressures (transmembrane pressures) were monitored. Both the nanofiltration membrane (product name: SR-90) and the reverse osmosis membrane (product name: SWHR) used in this example were manufactured by Dow Chemicals, Inc. A test set-up, utilizing a flat leaf membrane cell 32, manufactured by GE Osmonics Inc. under the model name SEPA CF II, is shown schematically in FIG. 3.

In this test apparatus, feedwater from a reservoir 34 was pumped through the flat leaf membrane cell 32 by a positive displacement pump 36. The reservoir was a 30 liter vessel having a stirrer (not shown) and was provided with a cooling water coil 38 and a temperature indicator 40. A permeate line 42, led from the outlet side of the membrane cell 32 to the reservoir, and was provided with a sample port 44. A concentrate line 46 led from the inlet side of the membrane cell to the reservoir, and included a pressure indicator 48, a flow control valve 50 and a sample port 52.

Figure 3:
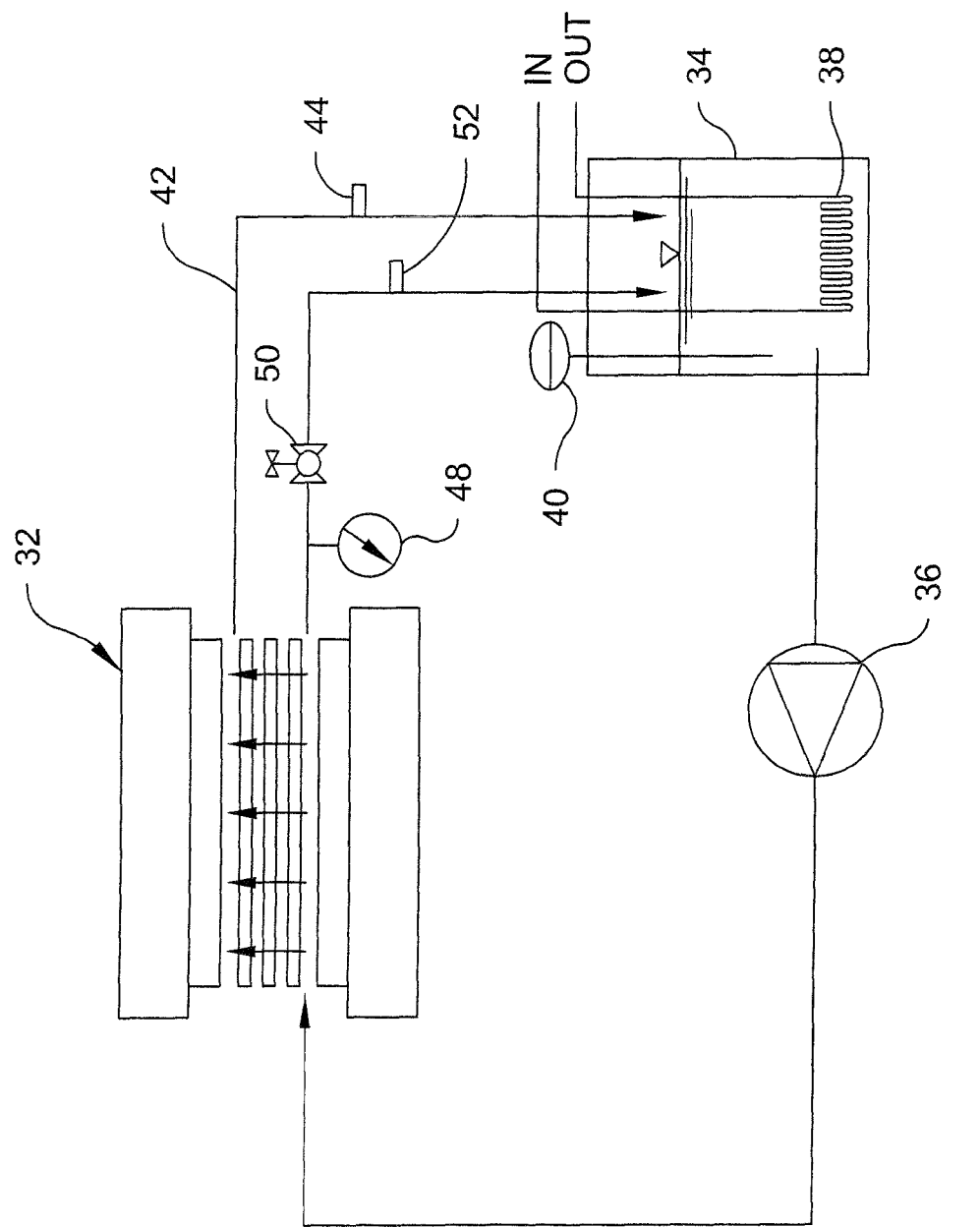
FIG. 3 is a schematic diagram of an apparatus comprising a flat leaf membrane cell used in experiments to determine the performance of reverse osmosis and nanofiltration on solutions having reduced osmotic pressure as a result of heterovalent ion exchange.
Figure 4:
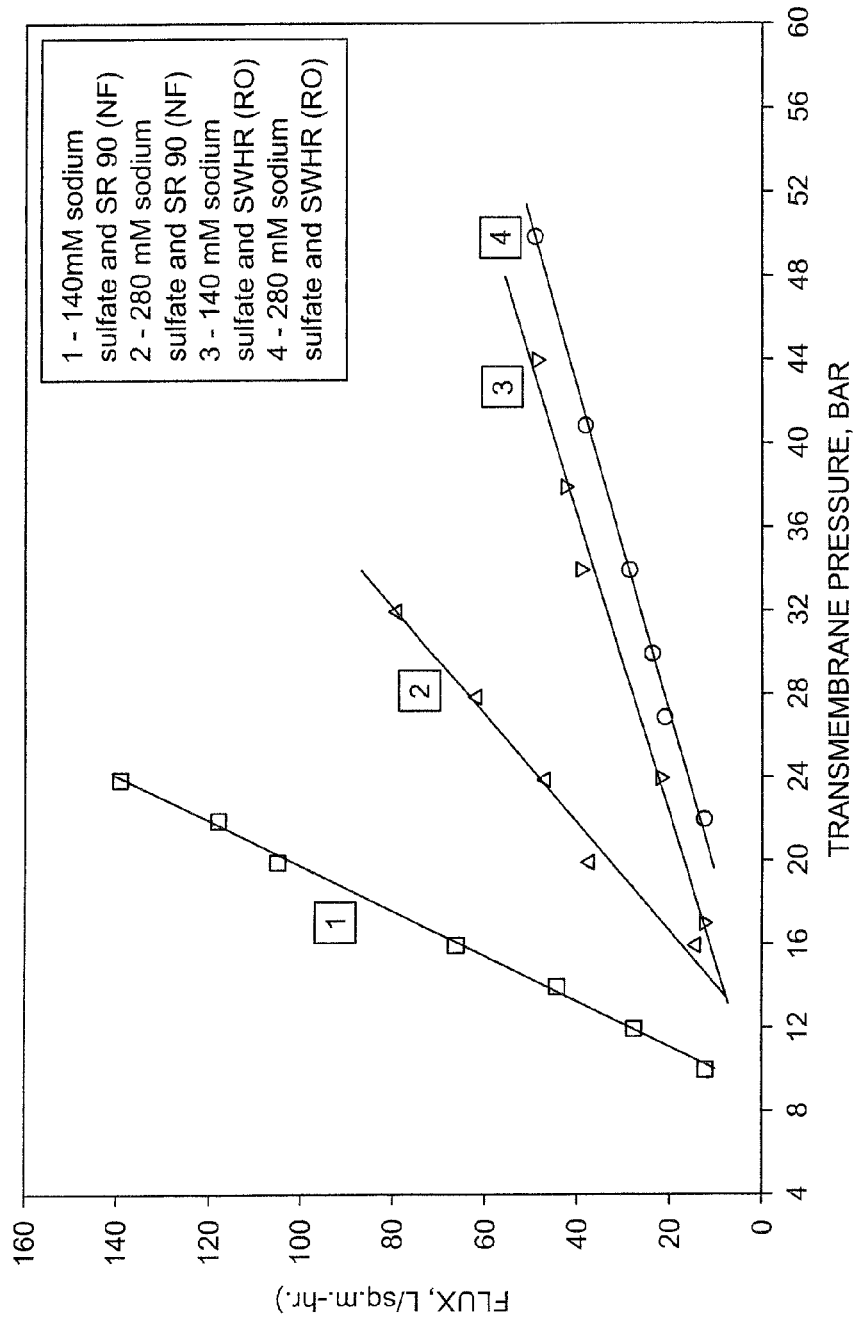
FIG. 4 is a graph showing permeate flux when sodium sulfate solutions at different concentrations were subjected to pressure-driven reverse osmosis and nanofiltration respectively.

FIG. 4 is a plot of permeate flux obtained at different transmembrane pressures when solutions with two different concentrations of sodium sulfate were subjected to nanofiltration (NF) and reverse osmosis (RO), using the test set-up of FIG. 3. At identical transmembrane pressures, a higher flux of permeate was obtained with the nanofiltration membrane than with the reverse osmosis membrane. As seen in FIG. 3, at a 140 mM concentration, a flux as high as 140 l/(m²·hr) could be obtained through the nanofiltration membrane at a pressure of 24 bar. At 280 mM of $Na_2SO_4$, the flux was considerably lower, but a flux of as much as 75 l/(m²·hr) could be obtained at a pressure of 32 bar. On the other hand, as shown in FIG. 4, the slopes of the flux vs. pressure curves for the reverse osmosis membrane were much more gradual than the slopes of the curves for the nanofiltration membrane. Pressure had less effect on flux in the case of the reverse osmosis membrane, and, even at a pressure of 44 bar, the flux at a concentration of 140 mM $Na_2SO_4$ was only about 45 L/sq. m-hr.

Figure 5:
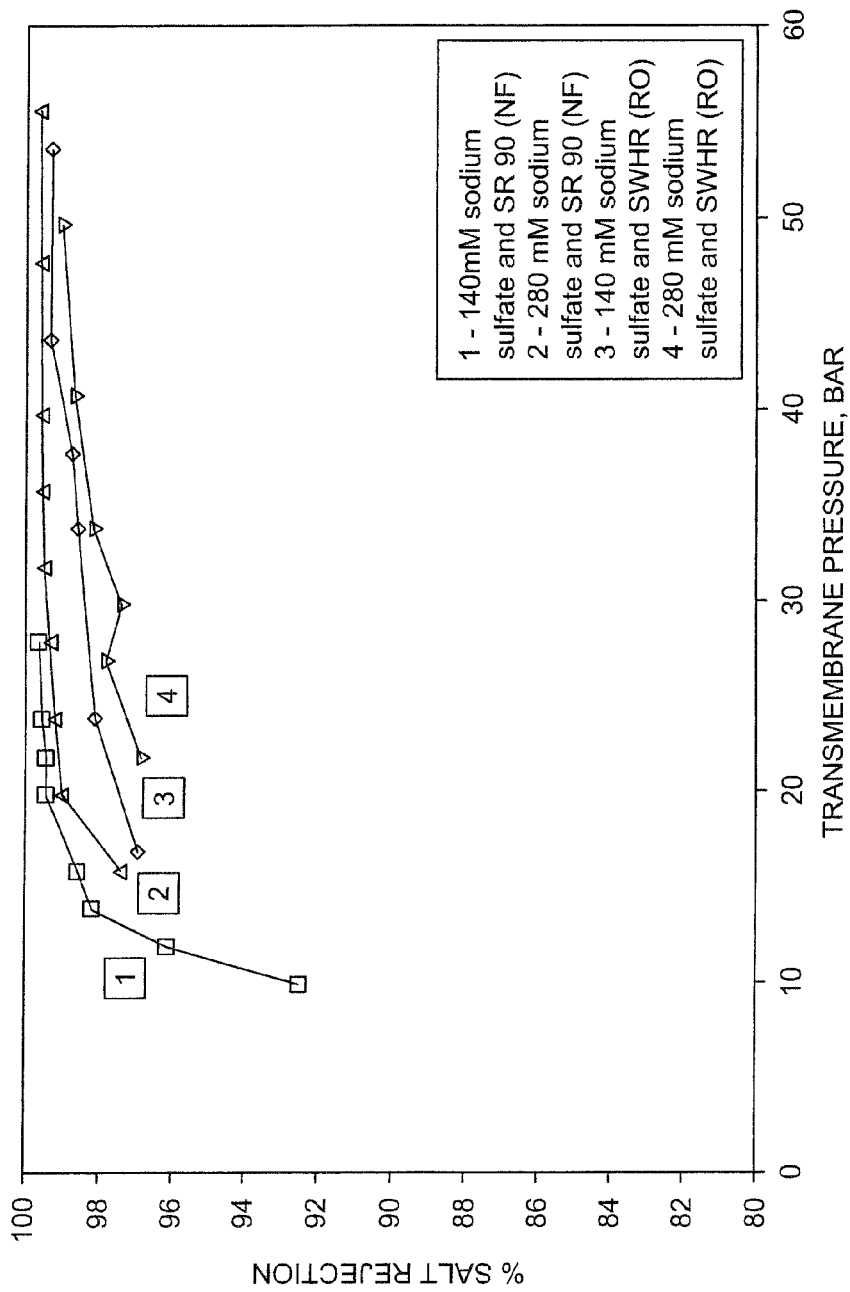
FIG. 5 is a graph showing salt rejection at varying transmembrane pressures for two different concentrations of sodium sulfate solutions, both subjected to nanofiltration and to reverse osmosis, respectively.

FIG. 5 represents the salt rejection characteristics of the membranes at different transmembrane pressures for solutions containing sodium sulfate. With the NF membrane, a higher percentage of salt rejection was achieved at a lower transmembrane pressure than with the RO membrane.

The higher permeate flux obtained in the NF process compared to the RO process indicates a lower energy requirement with NF. Thus, as suggested by FIGS. 4 and 5, in terms of the energy requirement for desalination of a solution containing 1-2 electrolyte (sodium sulfate), it is preferable to use nanofiltration instead of reverse osmosis. The same conclusion also applies in the cases of solutions containing 2-1 and 2-2 electrolytes.

When a solution containing 560 mM sodium chloride (560 mM chloride or 560 meq/L chloride) is passed through an anion exchanger in sulfate form, chloride ions are exchanged in equivalent concentrations for sulfate ions. Thus, the resultant solution from the anion exchanger has 560 meq/L sulfate. As sulfate ions are divalent, the molar concentration of sulfate in the solution is 280 mM. Thus, a 280 mM sulfate solution is obtained when a solution 560 mM chloride concentration is subjected to ion exchange. As this is an anion exchange process, there is no change in sodium ion concentration.

The resultant solution with 280 mM sulfate is subjected to nanofiltration. In a conventional desalination system, 560 mM chloride solution would be subjected to reverse osmosis. Desalination of a 560 mM sodium chloride solution through reverse osmosis is equivalent to nanofiltration of 280 mM sulfate solution. Similarly, desalination of 280 mM sodium chloride solution through reverse osmosis is equivalent to nanofiltration of 140 mM sulfate (sodium sulfate) solution.

Figure 6:
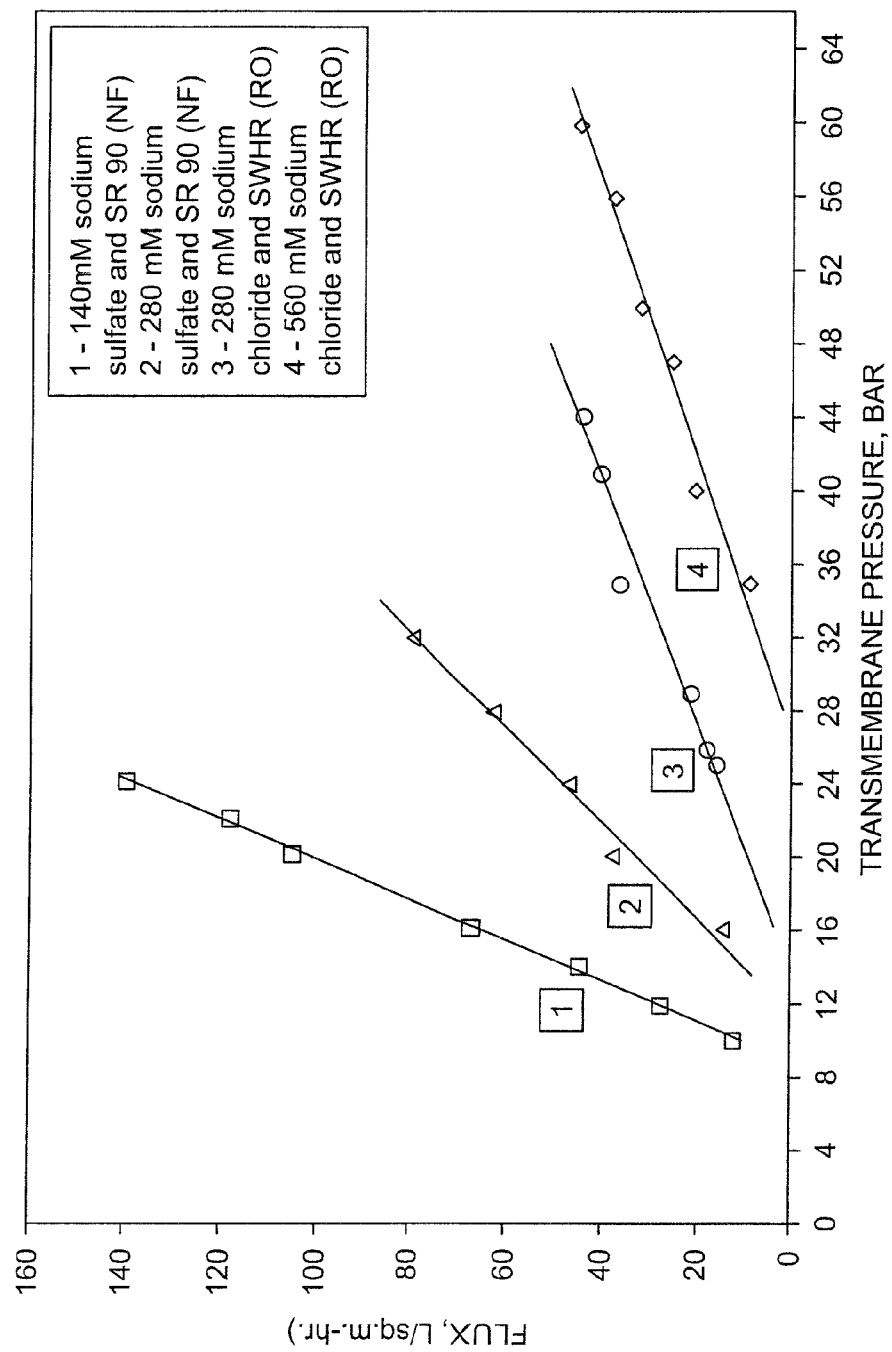
FIG. 6 is a graph comparing the relationships between permeate flux and transmembrane pressures for sodium sulfate solutions subjected to nanofiltration and sodium chloride solutions subjected to reverse osmosis.

FIG. 6 represents flux obtained at different transmembrane pressures when different sodium sulfate were subjected to nanofiltration and different sodium chloride solutions were subjected to reverse osmosis. For similar transmembrane pressures, sodium sulfate solutions that were subjected to NF (in the hybrid ion exchange-nanofiltration process) produced a significantly higher permeate flux compared to sodium chloride solutions subjected to a conventional RO process.

Figure 7:
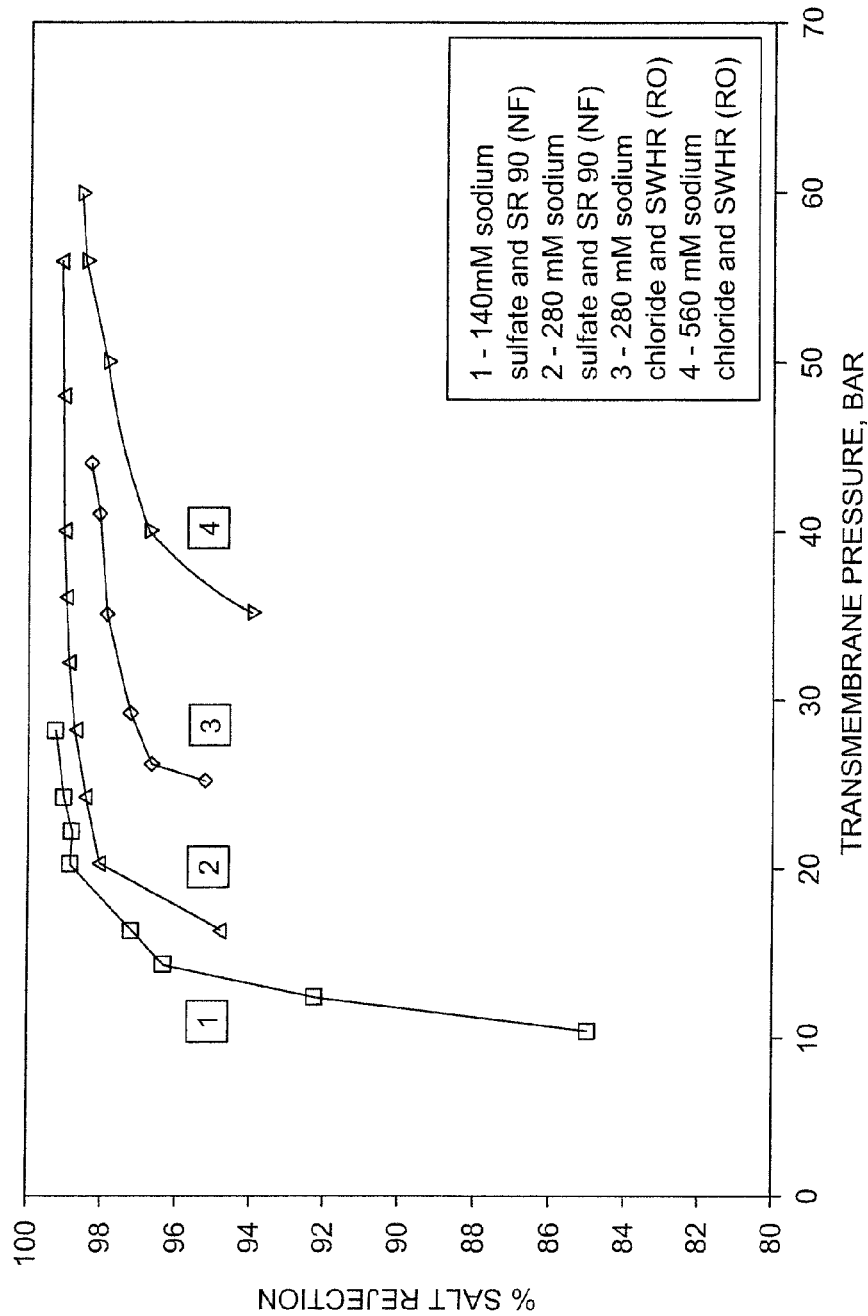
FIG. 7 is a graph comparing salt rejection at varying transmembrane pressures for sodium sulfate at two different concentrations subjected to nanofiltration, and for sodium chloride at two different concentrations subjected to reverse osmosis.

FIG. 7 indicates the percentage salt rejection values obtained at different transmembrane pressures when sodium chloride solutions were subjected to conventional RO and sodium sulfate solutions subjected to nanofiltration.

From the foregoing results, it can be concluded that the hybrid ion exchange nanofiltration process is much more energy efficient than the conventional reverse osmosis process. A detailed comparison of energy requirement in the two processes will be given in Example 3.

Example 1 compares conventional RO based processes for desalination of saline water containing sodium chloride, with a hybrid ion exchange-nanofiltration process in which an anion exchange resin in sulfate form is used. The results will be similar when cation exchange resin in divalent cationic form, e.g., calcium, is used in place of the anion exchanger. In such a case, sodium ions will be exchanged for calcium ions, thus transforming the 1-1 electrolyte to 2-1 electrolyte, which will be subjected to nanofiltration for desalination. Also, a mixed bed resin can be used where the 1-1 electrolyte is transformed to a 2-2 electrolyte.

Example 2

Figure 8:
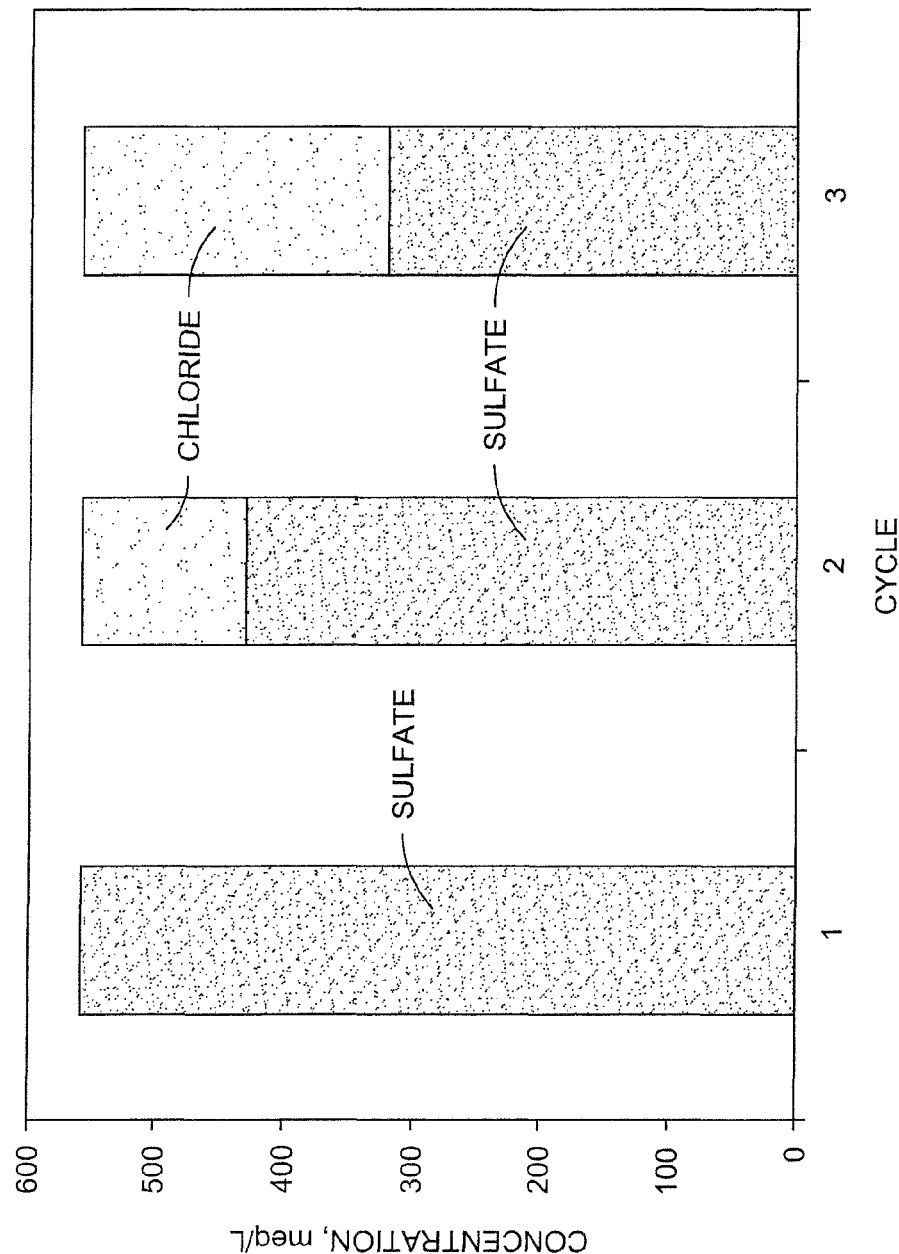
FIG. 8 is a bar graph comparing concentration and composition of effluent from and anion exchanger in consecutive cycles with an influent containing 560 meq/L of sodium chloride.
Figure 9:
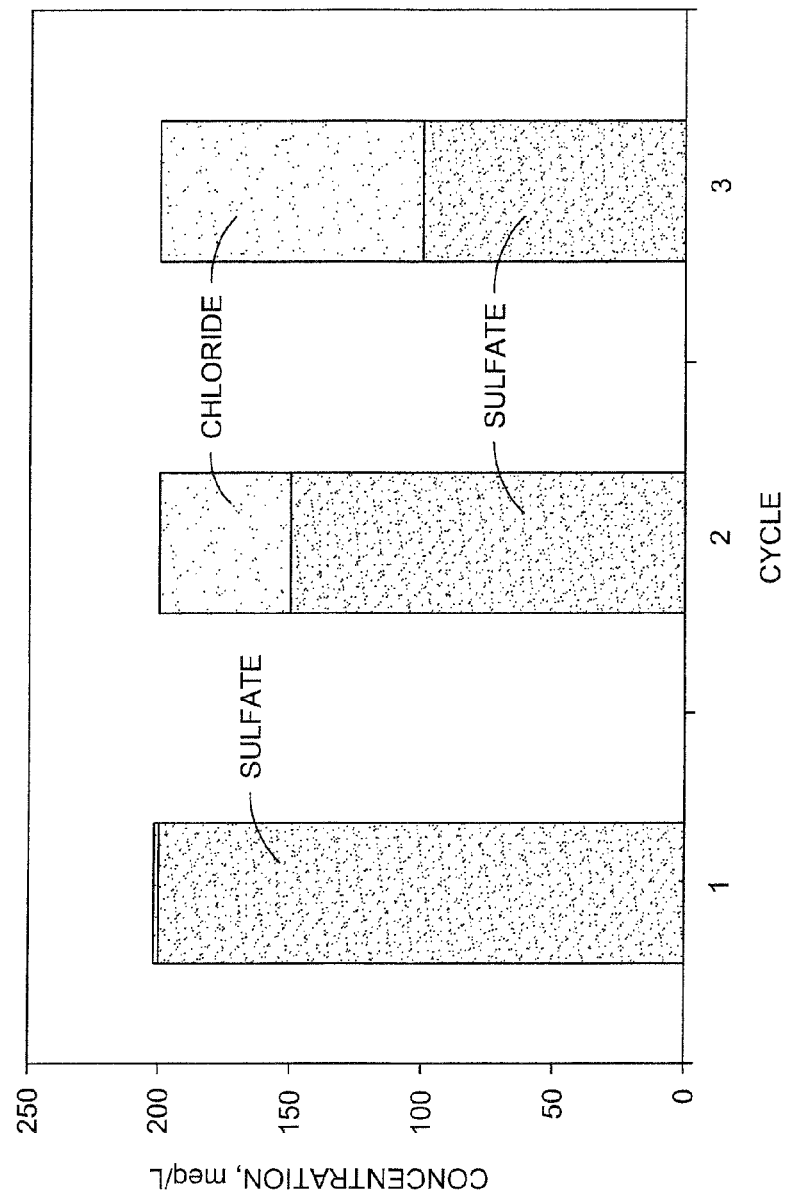
FIG. 9 is a bar graph comparing concentration and composition of effluent from and anion exchanger in consecutive cycles with an influent containing 200 meq/L of sodium chloride.

The ion exchange process used in the Hybrid ion exchange-nanofiltration process can either consist of cation exchange resins or anion exchange resins or both. In this example, anion exchange resin was utilized ahead of the nanofiltration process. The anion exchanger was initially transformed to divalent or higher valent anion form by contacting with a solution of the electrolyte that contains the anion. In this example, the anion exchange resin (Purolite Inc., A-850) was initially transformed to sulfate form by passing calcium sulfate solution through the resin bed. As a result, the anion exchange resin was converted to sulfate form. When a saline solution having 560 mM sodium chloride was passed through the resin, the resultant solution contained 560 meq/L of sulfate ion (280 mM). The resultant solution was then subjected to the nanofiltration. In the nanofiltration step, a salt-free permeate was obtained, leaving behind a concentrated brine containing sodium and sulfate ions at a concentration higher than that of the feed water. The concentrate was used to regenerate the anion exchange resin, which was then in chloride form, back to sulfate form. As the anion exchange resin is converted to sulfate form by regeneration, it releases chloride ions in a final solution which is the waste generated by the hybrid ion exchange-nanofiltration process. The resultant waste solution from the process is a solution of sodium chloride, but has a concentration much higher than that of the influent saline solution. The anion exchange resin is again subjected to a fresh solution of sodium chloride as influent to initiate another cycle. FIG. 8 shows the ionic composition and concentrations of the resultant solution (the feed to the nanofiltration stage) obtained over a few cycles when the influent solution contained 560 meq/L chloride. The results indicate sustainability of the process. FIG. 9 shows the results obtained when the influent solution had a concentration of 280 meq/L chloride.

This second example is also valid for cation exchange resin which initially may be in the form of divalent or higher valent cation, e.g., calcium. In this case, the influent saline solution containing a 1-1 electrolyte is converted to 2-1 electrolyte, e.g., calcium chloride.

When mixed bed of resin is used, it is possible to convert the 1-1 electrolyte solution to 2-2 electrolyte solution.

Example 3

Water Science and Technology Board, Division on Earth and Life Studies, National Research Council of National Academies (2004), "Review of the Desalination and Water Purification Technology Roadmap", National Academies Press, Washington D.C. discusses the energy requirements of high pressure pumps used for reverse osmosis and nanofiltration.

The energy requirements of high pressure pumps for reverse osmosis or nanofiltration of saline water are given by $$Emem = \frac{K * P_f}{\eta_{hyd} * \eta_{mot} * R} - E_{REC}$$

where, $E_{mem}$=energy needed for the high pressure pumping in the membrane process K=Unit conversion factor $P_f$=Feed Pressure R=System recovery ratio $E_{REC}$=Energy recovered through energy recovery devices $\eta_{hyd}$=pump hydraulic efficiency $\eta_{mot}$=efficiency of motor The energy recovery using energy recovery device (such as turbine) is given by:

$$E_{REC} = \frac{K * P_c * \eta_t * (1-R)}{\eta_{mot} * R}$$

where, $P_c$=Pressure of the concentrate stream $\eta_t$=efficiency of turbine

For the ideal case, all the efficiencies may be considered 100 percent and no frictional loss in the system is considered (so that $P_f$=$P_c$), then above equations can be combined as:

$E_{mem}$=K*$P_f$

In Example 1, for the RO system, a pressure of 60 bar was required to desalinate seawater with 560 meq/L chloride concentration (equivalent to about 33000 ppm sodium chloride). (See FIGS. 6 and 7.) The energy $E_{RO}$ required for desalinating 1 m³ of water at a pressure of 60 bar, using the RO process is given by the following calculation:

$$E_{RO} = 60 \text{ bar} \times \frac{10^5 N/m^2}{1 \text{ bar}} \times \frac{1 \text{ hr}}{3600 \text{ s}} \times 1 \text{ m}^3$$

Rearranging the above equation:

$$E_{RO} = 60 \times \frac{10^5}{3600} \times \frac{N \cdot m}{s} \times 1 \text{ hr}$$

Converting to energy in kWh:

$$E_{RO} = 60 \times \frac{10^5}{3600} \times \frac{N \cdot m}{s} \times \frac{1 \text{ W}}{1 \frac{N \cdot m}{s}} \times \frac{1 \text{ kW}}{1000 \text{ W}} \times 1 \text{ hr}$$

which yields:

$E_{RO}$=1.68 kWh

Thus, the minimum energy required for desalination in the conventional RO process is 1.68 kWh/M³.

In a hybrid ion exchange-nanofiltration process, a pressure of 32 bar is required for desalinating saline water containing about 32000 ppm sodium chloride. (See FIGS. 6 and 7.) The corresponding energy requirement for hybrid ion exchange-nanofiltration, considering the ideal case as before, for desalination of 1 m³ of seawater, is:

$E_{HIX-NF}$=0.89 kWh

In hybrid ion exchange-nanofiltration, the minimum energy requirement for desalination is only 0.89 kWh/m³, which is almost half of the energy requirement in the conventional RO process. Therefore, there is a huge energy savings in hybrid ion exchange-nanofiltration compared to the conventional RO process.

The permeate flux obtained during desalination of 560 meq/L chloride solution using an RO membrane is 45 L/m²·hr under a pressure of 60 bar. Therefore, in the conventional RO process of desalination, at a flow rate of 1 m³/hr using this membrane, the membrane area required is:

$$A_{RO} = 1 \frac{m^3}{hr} \bigg/ 45 \frac{1}{m^2 \cdot hr} = 22.2 \text{ m}^2$$

Whereas in the hybrid ion exchange-nanofiltration process the permeate flux was 70 L/m²·hr at a pressure of 32 bar. Thus, for desalination at a flow rate of 1 m³/hr using the hybrid ion exchange-nanofiltration process, the area of the NF membrane required is:

$$A_{NF} = 1 \frac{m^3}{hr} \bigg/ 70 \frac{1}{m^2 \cdot hr} = 14.28 \text{ m}^2$$

Not only there is a less membrane area required for hybrid ion exchange-nanofiltration, but also there will be a cost saving, as NF membranes are cheaper than RO membranes. Also, as the pressure requirement is less, there will be a considerable cost saving on pumps, pipelines, valves, etc., which can now be rated to work at a lower pressure. Moreover, there will be a significant saving on the cost of energy.

Various modifications can be made to the apparatus and process described above. For example, whereas FIG. 2 shows two ion exchange beds, it is possible to carry out the process with a single bed, interrupting its ion exchange function periodically for regeneration by collected divalent or polyvalent ions. It is also possible to utilize more than two ion-exchange beds, and to carry out ion exchange by operating the beds in a repeating sequence of individual beds or groups of beds, regenerating the beds while they are not being fed with water containing sodium chloride. With two or more beds, it is possible to deliver a continuous stream of desalinated water without the need for a large holding tank.

In addition, whereas FIG. 2 shows two ion exchange beds used with a single semi-permeable membrane unit, the semi-permeable membrane separator can comprise plural membrane units membranes operated in series or parallel, or in series/parallel arrangement. Moreover, the semi-permeable membrane separator can comprise plural membrane units, each unit being associated with a different one of plural ion exchange beds.

What is claimed is:

1. A desalination process comprising the steps of:
   exposing water containing sodium chloride to an ion exchange material in divalent or polyvalent ionic form, wherein monovalent sodium ions, or monovalent chloride ions, or both the monovalent sodium ions and the monovalent chloride ions of at least a portion of the sodium chloride content in said water are exchanged for divalent or polyvalent ions, thereby producing a solution containing said divalent or polyvalent ions, whereby said solution has an osmotic pressure lower than the osmotic pressure of said water containing sodium chloride; and
   causing said solution to pass through a semi-permeable membrane separator, thereby separating divalent or polyvalent ions from said solution and producing desalinated water.

2. The desalination process of claim 1, in which said solution containing divalent or polyvalent ions is caused to pass through said semi-permeable membrane separator by applying pressure to said solution.

3. The desalination process of claim 1, in which said solution containing divalent or polyvalent ions is caused to pass through said semi-permeable membrane separator by applying, to said solution, a pressure lower than the pressure that would be required for removal of sodium chloride from said water containing sodium chloride by reverse osmosis.

4. The desalination process of claim 1, in which said semi-permeable membrane separator comprises a nanofiltration membrane.

5. The desalination process of claim 1, including the step of collecting divalent or polyvalent ions separated from said solution, and exposing said ion exchange material to said collected divalent or polyvalent ions, thereby regenerating the ion exchange material.

6. The desalination process of claim 1, including the step of collecting divalent or polyvalent ions separated from said solution, and exposing said ion exchange material to said collected divalent or polyvalent ions, in which the step of exposing water containing sodium chloride to an ion exchange material is carried out by passing water containing sodium chloride, in a repeating sequence, through plural beds of ion exchange material, and in which each of said plural beds ion exchange material is exposed to said collected divalent or polyvalent ions, and thereby regenerated, while water containing sodium chloride is passing through at least one other bed of said plural beds.

7. A desalination process using synergistic ion exchange and pressure-driven semi-permeable membrane filtration processes where an ion exchanger containing an ion exchange material in divalent or polyvalent ionic form converts the monovalent sodium or chloride ions or both, of saline water, to divalent or polyvalent ions towards reduction of osmotic pressure to a level below the osmotic pressure of saline water; and where the resultant solution is subsequently desalinated through a pressure-driven semi-permeable membrane separation process, at lower hydraulic pressure compared to that required to desalinate the original saline water through a reverse osmosis process.

8. A desalination process according to claim 7 in which the pressure-driven semi-permeable membrane process is nanofiltration.

9. A desalination process according to claim 7 wherein the said process is employed in conjunction with a regeneration process wherein concentrated reject solution from the semi-permeable membrane process is used as a regenerant for the exhausted ion exchanger in monovalent ion form, so that it is cyclically transformed to a di- or poly-valent ionic form, whereby process sustainability is facilitated.

10. The desalination process of claim 1, in which said semi-permeable membrane separator comprises a nanofiltration membrane, and in which said solution containing divalent or polyvalent ions is caused to pass through said nanofiltration membrane by applying pressure to said solution.

11. The desalination process of claim 1, in which said semi-permeable membrane separator comprises a nanofiltration membrane, and in which said solution containing divalent or polyvalent ions is caused to pass through said nanofiltration membrane by applying, to said solution, a pressure lower than the pressure that would be required for removal of sodium chloride from said water containing sodium chloride by reverse osmosis.

12. The desalination process of claim 1, in which, in the step of exposing water containing sodium chloride to an ion exchange material in divalent or polyvalent ionic form, both the monovalent sodium ions and the monovalent chloride ions of at least a portion of the sodium chloride content in said water are exchanged for divalent or polyvalent ions.

\* \* \* \* \*